UNITED STATES PATENT OFFICE.

JOHN N. CROUSE, OF CHICAGO, ILLINOIS.

DENTAL CEMENT.

No. 902,562.    Specification of Letters Patent.    Patented Nov. 3, 1908.

Application filed May 23, 1907. Serial No. 375,206.

*To all whom it may concern:*

Be it known that I, JOHN N. CROUSE, a citizen of the United States, residing at Chicago, in the county of Cook and State of Illinois, have invented certain new and useful Improvements in Dental Cement, of which the following is a specification.

This invention relates to a dental cement for use in securing inlays, fillings and crowns; and the invention has for its principal object to provide a cement possessing superior adhesiveness and imperviousness to moisture, as compared with dental cements at present in use.

My improved cement includes among its ingredients oxid of tin, oxid of zinc, and phosphoric acid with which the tin and zinc oxids are mixed into a paste form by the dentist when the cement is ready for use. Preferably the oxids of tin and zinc are both calcined by being subjected to a temperature of from 2200° to 2400° Fahrenheit. I also preferably use phosphoric acid holding in solution a certain proportion of phosphate of alumina. This liquid is prepared by diluting the phosphoric acid somewhat with water, heating this gently, and adding to it the requisite proportion of aluminum metal. When the metal is dissolved, the liquid is allowed to cool; it is then filtered through papers and evaporated at not over 212° F. until the desired density has been reached. In addition to the above recited ingredients, I also employ in association therewith a specially formed ingredient which has no known chemical name that I am aware of, but which is believed to contain a mixture of phosphate of tin and dioxid of tin, and which I obtain through the oxidation of tin in the presence of strong nitric acid. This substance which, when united with the other ingredients specified, forms a more adhesive, more compact, and more insoluble compound than would otherwise result, is prepared as follows:

Into a porcelain dish, which will hold about double the quantity of the materials to be employed, I introduce phosphoric acid, 85 per cent., and pure nitric acid, specific gravity 1.42, in the proportions of 1.753 pounds of the former to 51 pounds of the latter. I thoroughly mix the liquids, and apply heat to the dish until its contents have reached a temperature of about 100° F. I then discontinue the heat and add pure tin, granulated, 10 pounds. The oxidation of the tin soon begins, attended by the evolution of nitrogen dioxid, which, in contact with the air, forms higher oxids of nitrogen, appearing as red fumes. As these fumes are noxious, the operation should be conducted in a fume chamber, or in the open air. The oxidation of the tin will go on for several hours, during which time the mixture should be occasionally stirred with a heavy glass rod. When the reaction slackens, heat is again applied to the dish, the mixture being stirred as before, until the evolution of red fumes has nearly ceased, and no particles of metallic tin are noticeable in stirring. Should metal still remain undissolved, a little nitric acid may be added and the heat continued until the metallic particles have disappeared. The heat is then discontinued, and the dish filled with hot water, the sediment being mixed with the latter by thorough stirring. I then allow the mixture to stand several hours, and then draw off from the dish, by means of a siphon, or otherwise, the clear liquid, taking care not to disturb the sediment. I then refill the dish with hot water, again allow the mixture to stand, and again decant the clear liquid. This washing of the sediment by decantation is repeated in the same manner, until the washings, tested by litmus paper, show no acid to be present. I then pour the sediment upon a dampened muslin strainer and allow the liquid to drain off. The substance at this point is believed to represent a mixture of metastannic acid with phosphate of tin. When the liquid ceases to pass, I place the strainer and its contents in a drying room, heated to 212° F. or higher until the sediment becomes dehydrated and quite dry. This fact may be ascertained by weighing the strainer and its contents from time to time until the weight becomes constant. This dehydration converts the metastannic acid into stannic oxid or dioxid of tin, so that the dried product represents a mixture of dioxid of tin and phosphate of tin, which should be ground, sifted, and finally mixed.

The theory of the formation of dental cements from the action of phosphoric acid, or phosphoric acid containing a little phosphate of alumina, upon (1) oxid of zinc, (2) a mixture of oxid of zinc and an oxid of tin, and (3) a mixture of zinc oxid, an oxid of tin, and phosphate of tin, may be stated somewhat as follows:

(1). When phosphoric acid is brought in contact with an excess of oxid of zinc, it combines therein, forming the ordinary cement, lacking in many desirable qualities.

(2). When this acid acts upon oxid of zinc associated with an oxid of tin, the oxid of zinc is acted upon as in (1), but the oxid of tin does not chemically combine, but acts as a filler and hardener, thus making the resulting cement more insoluble, more compact, and less affected by fluids.

(3). In the use of phosphate of tin in connection with zinc oxid and an oxid of tin, the phosphate of tin dissolves in the phosphoric acid, thus giving to the resulting cement not only greater hardness and rendering it more impervious to liquids, but also conferring upon it greater plasticity and adhesiveness.

The best results thus far have been secured by a mixture of the ingredients in substantially the following proportions by weight: oxid of tin 50; oxid of zinc, 100; mixture of dioxid of tin and phosphate of tin formed as above described, 25; and sufficient phosphoric acid to make a paste of the proper consistency; but I wish it to be understood that these proportions may be varied within wide limits and still give excellent results.

So far as I am aware, pure phosphate of tin is not a known commercial product, and the process above described of obtaining it in association with dioxid of tin is the only mode of obtaining it with which I am acquainted. It is evident, however, that, given the phosphate of tin, it is immaterial in the resulting compound forming the subject-matter of the present invention whether oxid of tin or dioxid of tin, or both, be employed, so long as one or both of these oxids is present in suitable proportion.

I claim:

1. A dental cement comprising in its composition zinc oxid, phosphate of tin, an oxid of tin, and phosphoric acid.

2. A dental cement comprising in its composition tin oxid, zinc oxid, dioxid of tin, phosphate of tin, and phosphoric acid.

3. A dental cement comprising in its composition calcined tin oxid, calcined zinc oxid, dioxid of tin and phosphate of tin mixed and reduced to powdered form, and phosphoric acid.

4. A dental cement comprising in its composition the following ingredients in substantially the following stated proportions by weight: tin oxid, 50; zinc oxid, 100; powdered mixture of dioxid of tin and phosphate of tin, 25; and phosphoric acid in sufficient quantity to reduce the mixture to a paste form.

JOHN N. CROUSE.

Witnesses:
SAMUEL N. POND,
FREDERICK C. GOODWIN.